United States Patent [19]

Smit

[11] 4,141,286
[45] Feb. 27, 1979

[54] THROUGHFLOW HEATER FOR COFFEE MAKING APPARATUS

[75] Inventor: Gerard C. Smit, Amerongen, Netherlands

[73] Assignee: Smitdesign B.V., Amerongen, Netherlands

[21] Appl. No.: 864,232

[22] Filed: Dec. 27, 1977

Related U.S. Application Data

[63] Continuation of Ser. No. 646,750, Jan. 6, 1976, abandoned.

[30] Foreign Application Priority Data

Jan. 7, 1975 [NL] Netherlands .......................... 7500158

[51] Int. Cl.² ............................................. A47J 36/42
[52] U.S. Cl. ......................................... 99/285; 99/307
[58] Field of Search ................ 99/285, 280, 281, 282, 99/283, 291, 300, 304, 307, 316; 219/517, 523, 538, 541

[56] References Cited

U.S. PATENT DOCUMENTS

| | | | |
|---|---|---|---|
| 1,174,443 | 3/1916 | Quain | 219/517 |
| 1,672,800 | 6/1928 | Boss | 219/517 |
| 2,846,938 | 8/1958 | Brandl | 99/281 |
| 3,261,280 | 7/1966 | Kaplan | 99/291 |
| 3,518,933 | 7/1970 | Weber | 99/283 |
| 3,682,089 | 8/1972 | Unger | 99/281 |
| 3,759,161 | 9/1973 | Anderson | 99/282 |
| 3,793,933 | 2/1974 | Weber | 99/283 |
| 3,869,968 | 3/1975 | Ihlenfeld | 99/280 |

*Primary Examiner*—Robert W. Jenkins
*Attorney, Agent, or Firm*—Walter Becker

[57] ABSTRACT

In a coffee making apparatus, a throughflow heater for heating water to be passed to a filter, said heater being included in a water throughflow passage extending from a water reservoir to an outlet pipe extending over said filter, is made, at least in part, of transparent material to enable the user to see whether the heater is fouled with scale deposits so that cleaning is necessary. Safety is enhanced by making the heater of transparent heat resistant glass and using one or more heating elements of the submersible type therein.

5 Claims, 5 Drawing Figures

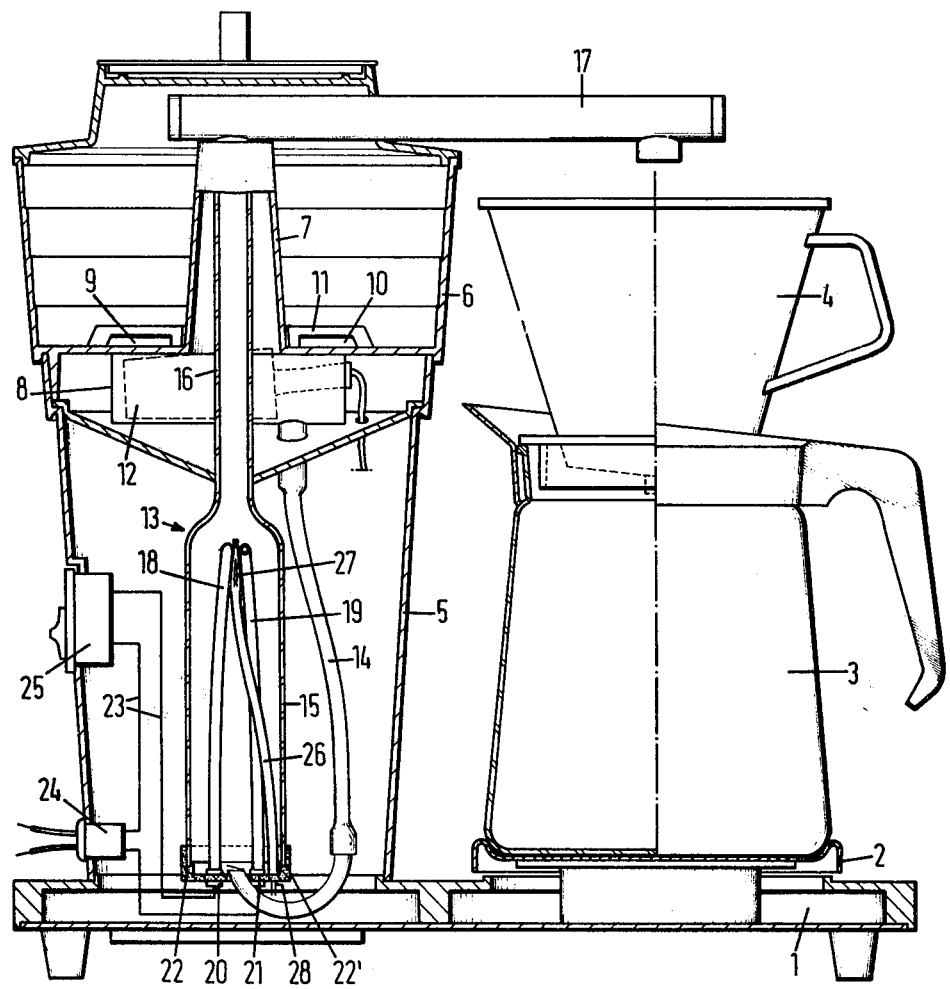

THROUGHFLOW HEATER FOR COFFEE MAKING APPARATUS

This is a continuation of application Ser. No. 646,750, filed Jan. 6, 1976 now abandoned.

This invention relates to a throughflow heater for use in coffee making apparatus.

A coffee making apparatus incorporating a throughflow heater of the kind to which the present invention relates is described in Dutch patent application No. 6808675. Such a heater, which serves for electrically heating water to be passed to a filter, is included in a water throughflow path extending from a water reservoir to an outlet pipe terminating over the filter.

The present invention is concerned with the safeguarding of such a throughflow heater from the effects of scale deposits. Water pollution is a virtually universal problem, and in areas with so-called hard water, the deposition of scale in apparatus in which tap water is heated to temperatures above 68° C. is inevitable. Scale is deposited on the inside of the heater, so that if electrical heating coils are mounted on the outside, these will be able to transmit less and less heat to the water within the heater owing to the heat insulating layer of scale.

Therefore, such coffee making apparatus is commonly accompanied with the instruction that, if hard tap water is used, the apparatus must be periodically cleaned, for example, with vinegar. In practice, such cleaning is not effected, or at least not in time. In the long run, therefore, a thick layer of scale will have formed within the heater, with the result that the heating coils cannot dispose of their heat to the water, at least not to a sufficient extent, and become overheated and ultimately may burn out. Apart from being a potential fire hazard, this may cause permanent damage to the apparatus, which commonly has a housing made of plastics.

In order to remedy this drawback, coffee making apparatus of the kind referred to have been provided with safety devices in the form of fuses, connected in series with the coil. When a given temperature is exceeded, these break the circuit. Nevertheless there is the drawback here that, before the circuit is broken, the heating coil become so hot as to burn out, or the temperature becomes so high that at any rate the coil loses its tension, which interferes with proper heat transfer. Indeed, in the case of breakdown, it is mostly found necessary to replace the entire heater.

Generally speaking, prior proposals for safeguarding coffee making apparatus from burning of the heating coils due to the deposition of scale, resulting in damage to the housing, are all based on the sensing of temperature in the space without the heater and within the housing of the apparatus. Thus is it known to provide a thermoswitch on the outside of the coil windings which when a threshold temperature is exceeded either actuates an alarm lamp or operates a switch with a knob that shoots out, in which case the apparatus can be re-used after cooling. In practice, such switches are found to have an unreliable operation.

The present invention is based upon an entirely different approach to the problem outlined above, namely, detecting the presence of scale and hence the necessity of cleaning with vinegar, not by indirect means, i.e. the sensing of temperature, but by direct means.

According to the present invention, there is provided in a coffee making apparatus, a throughflow heater for heating water to be passed to a filter, said heater being included in a water throughflow path extending from a water reservoir to an outlet pipe extending over said filter, characterized in that at least a portion of said throughflow heater, visible to the user of the apparatus, is made of transparent material.

By virtue of this arrangement scale deposits can be visually observed, so that the user is not dependent on the reliability of parts, such as temperature measuring means, for determining the presence of, and the extent of, scale deposits by indirect means.

In a further elaboration of the invention, there is provided in a coffee making apparatus having a transparent water reservoir supported on a hollow housing, a throughflow heater for heating water to be passed to a filter, said throughflow heater being included in a water throughflow path extending from said water reservoir to an outlet pipe extending over said filter, said heater comprising a hollow tube extending vertically within the apparatus, said tube having a wider portion located within said hollow housing and constituting a water heating section, and a narrower portion extending through said reservoir and connecting said water heating section to said outlet pipe, characterized in that said wider portion and said narrower portion of the tube are made of heat resistant transparent material, and in that at least one heating element of the submersible type extends into said wider portion from the bottom thereof.

The wider portion and the narrower portion of the tube may be made of heat-resistant glass. Heat-resistant glasses are well-known, there being varieties resistant to temperatures of several hundred degrees centigrade. One or more immersion heater elements may be used, depending on whether the apparatus is to be suitable for just one filtering method or adaptable for either the normal filtering method using a round filter and relatively coarsely ground coffee, and the so-called quick filtering method using a paper filter and relatively finely ground coffee.

The use of immersion heater elements in combination with a water throughflow tube of heat resistant glass has the additional advantage that, it the heater elements become overheated and damaged after all, resulting in short-circuiting, the housing of the apparatus will not be damaged, because the heat resistant glass tube will remain intact. In such cases, therefore, damage will be confined to the heater.

For further protection of the apparatus, temperature-responsive tripping means may be provided in the form of a fuse accommodated in a chamber in fixed heat transmitting contact with the hottest spot of the heater, i.e., generally the portion located closest to the transition of the wider tube portion to the narrower tube portion of the heater. When such a fuse is used, it is even possible to use plastics instead of heat-resistant glass for the transparent material, there being known plastics having a maximum permissible temperature of about 140° C. The fuse may then be selected to blow at a lower threshold temperature, for example 120° C. The advantage is that, if the threshold temperature is exceeded and the fuse blows, it will generally be sufficient just to replace the fuse.

One embodiment of the present invention will now be described, by way of example, with reference to the accompanying drawing, which shows a coffee making apparatus embodying the principles of the present invention, partly in side elevational view and partly in vertical section.

Referring to the drawing, there is shown a coffee making apparatus having a base plate 1 with a heating plate 2 for keeping warm a filtrate can 3 carrying a removable filter funnel 4.

Mounted on base plate 1 is a hollow housing 5 on which is placed a water reservoir 6 of transparent material. The bottom of reservoir 6 is formed with an integral central column 7, likewise of transparent material, and is provided with an eccentric recessed portion forming a float chamber 8. Float chamber 8 is domed with a cover cap 11 having lateral slot passages 9, 10 and a vending slot (not shown). Provided within float chamber 8 is a float 12 having a switch therein responsive to the relative position of the float and included in the electrical circuit of a throughflow heater 13 for switching the latter on and off depending on the water level in the float chamber. Since the switch does not constitute part of the present invention, it will not be further described here.

Via float chamber 3, water from reservoir 6 can reach the bottom end of heater 13 through a conduit 14.

Heater 13 consists of a tube made of transparent material, such as heat resistant glass, and having a wider lower portion 15 and a narrower upper portion 16 extending through column 7 upwardly into water reservoir 6 and being in communication with an outlet pipe 17 terminating over filter funnel 4.

From the wider lower end of tube 15, 16, two heating elements 18, 19 of the submersible type extend upwardly into the wide portion 15. Elements 18, 19 are fixed in a cup-shaped cover 22 at 20 and 21, respectively. Cover 22 is connected to glass tube 15, 16 through a gasket 22' compensating for dimensional tolerances.

Electrical lines 23 connect elements 18, 19 to an electrical terminal 24 and a switch 25. Depending on whether the user wishes to make coffee by a normal filtering process or by a quick filtering process, one or both heating elements 18 and 19 are switched on. If reservoir 6 has a capacity of, for example, 1 liter, this quantity is allowed to flow through heater 13 in about 5 minutes with both heating elements, each having a power of 550 watt, switched on. In this quick filtering process a paper filter is placed in funnel 4 and finely-ground coffee is used.

Scale formation in the water path is visible in the narrow tube portion 16 extending within column 7 in water reservoir 6. Consequently, scale deposits will always be detected in time, so that timely cleaning, for example, with vinegar, can be undertaken.

In the uphoped-for case that elements 18 and 19 should become overheated all the same and break, the heat resistant glass tube 15, 16 will ensure that damage is confined to the interior of heater 13. Heat resistant glass is commercially available in varieties resistant to temperatures higher than can be reached with the immersion heater elements.

By way of additional protection, use can be made of known per se, commercially available thermal tripping devices, such as chemical fuses.

For example, and as shown, in a tube 26 such a fuse 27 can be placed. Tube 27 is in direct heat exchange contact with the hottest portions of elements 18, 19, for example, it is soldered to the portion located closest to the transition of the wider tube portion 15 to the narrow tube portion 16. The fuse is included in the electrical circuit of elements 18 and 19 through a connection 28.

Fuse 27 may be adapted to blow at a temperature of, for example, 120° C. In that case it would be possible to make tube 15, 16 of transparent plastics material with a permissible temperature of 140° C. instead of heat-resistant glass.

In summary it can be stated that the arrangement of the throughflow heater of heat resistant glass and heating elements of the submersible type, as described above, provides two distinct major advantages, namely, first, scale deposits can be detected direct through visibility rather than by indirect means as used in the prior art, i.e. by sensing the temperature in the space outside the heater 13 and inside housing 5, which devices have proved to be unreliable in practice, and second, damage to the heating elements is confined to the interior of the heater. Furthermore, owing to minimum heat radiation to the outside, a throughflow heater of heat resistant glass provides the possibility of using cheaper plastics for the housing. With prior throughflow heater having heating elements in the form of electrical heating coils wound around the wider tube portion 15, damage to the heating elements may lead to damage to the housing owing to undue heat radiation to the outside.

It will be clear that the invention is not limited to the embodiment described and shown in the accompanying drawing. Thus elements 18, 19 may be of different shape and a different number may be used. Thus two U-shaped tubes may be used or a single tube if only one, slow filtering method is envisaged. Also, the outlet pipe may be made, at least in part, of transparent material in order that scale deposits therein may be visible.

I claim:

1. A coffee making apparatus comprising a hollow housing, a transparent water reservoir supported on said housing and having a tubular central support and a recessed central float chamber in its base, a throughflow heater having heating element means for heating water to be passed to a coffee filter, said throughflow heater being included in a water throughflow path extending from said water reservoir to an outlet pipe extending over said coffee filter, said throughflow heater having a relatively wide lower tubular portion located within said hollow housing and a relatively narrower upper tubular portion extending through the float chamber and transparent central support and the transparent water reservoir, and a transition between said narrower upper portion and said wide lower portion, a removable closure cap on the bottom of said throughflow heater, said heating element means being disposed on said closure cap and in said lower portion, said relatively narrower upper portion extending through the transparent water reservoir, the narrower upper portion of said throughflow heater being made of transparent material and the heating element means thereof including at least one heating element of the submersible type extending within the wider portion substantially up to the transition between the wider portion and the narrower portion, said transparent upper tubular portion being visible through said transparent reservoir.

2. In combination with a coffee making apparatus having a transparent water reservoir supported on a hollow housing, a throughflow heater for heating water to be passed to a coffee filter, said throughflow heater being included in a water throughflow path extending from said water reservoir to an outlet pipe extending over said filter, said heater comprising a hollow tube extending vertically within the apparatus, said tube having a wider portion located within said hollow housing and constituting a water heating section, and a narrower portion extending upwardly through said reservior and connecting said water heating section to said outlet pipe, said narrower portion of the tube being made of heat resistant transparent material, and at least one heating element of the submersible type in said wider portion below and adjacent to said narrower portion, so that scale in said narrower portion is visible through said reservoir.

3. A coffee making apparatus having a hollow housing supporting a transparent water reservoir, comprising in combination: a throughflow heater arranged in the housing of the coffee making machine and having a tube portion extending upwardly through the transparent water reservoir, heating means provided below said tube portion of the throughflow heater with said throughflow heater included in a water throughflow path extending from the water reservoir to an outlet pipe discharging over a coffee filter, the tube portion extending through said reservoir being made of transparent material and all elements of the reservoir outwardly of said tube portion being transparent, so that scale forming in said tube portion is visible from the outside through the transparent water reservoir.

4. A coffee making apparatus as claimed in claim 3, in which said heating means is in the throughflow path of said heater.

5. A coffee making apparatus as claimed in claim 3, in which said throughflow heater includes a passage of greater diameter than said tube portion below said tube portion, and said heating means is of the immersion type located in said passage immediately adjacent the transition between said passage and said tube portion.

* * * * *